United States Patent
Noh (10) Patent No.: US 11,611,399 B2
(45) Date of Patent: Mar. 21, 2023

(54) ACOUSTIC COMMUNICATION SYSTEM AND DATA TRANSMISSION AND RECEPTION METHOD THEREFOR

(71) Applicants: HYUNDAI MOTOR COMPANY, Seoul (KR); KIA MOTORS CORPORATION, Seoul (KR)

(72) Inventor: Jung Uk Noh, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 707 days.

(21) Appl. No.: 16/587,953

(22) Filed: Sep. 30, 2019

(65) Prior Publication Data

US 2020/0396009 A1 Dec. 17, 2020

(30) Foreign Application Priority Data

Jun. 17, 2019 (KR) ........................ 10-2019-0071698

(51) Int. Cl.
| | |
|---|---|
| *H04B 11/00* | (2006.01) |
| *H04W 4/40* | (2018.01) |
| *G10L 25/51* | (2013.01) |
| *G10K 15/02* | (2006.01) |

(52) U.S. Cl.
CPC ............. *H04B 11/00* (2013.01); *G10K 15/02* (2013.01); *G10L 25/51* (2013.01); *H04W 4/40* (2018.02)

(58) Field of Classification Search
CPC ...... H04B 11/00; H04B 1/3822; G10K 15/02; G10L 25/51; H04W 4/40; H04W 4/46; G08B 21/02; H04L 1/0041; H04L 1/0045; H04L 1/0056; B60Q 5/008; B60Y 2200/91; B60Y 2302/03
See application file for complete search history.

(56) References Cited

U.S. PATENT DOCUMENTS

| | | | |
|---|---|---|---|
| 9,792,916 B2 * | 10/2017 | Shirahama | ............... G10H 7/04 |
| 10,229,598 B1 * | 3/2019 | Doig | ..................... G08G 1/005 |
| 10,243,675 B2 * | 3/2019 | Jeong | ..................... H04B 11/00 |
| 10,320,490 B2 | 6/2019 | Feng | |
| 10,364,669 B2 * | 7/2019 | Clawson | ........... H04W 72/0446 |

(Continued)

FOREIGN PATENT DOCUMENTS

| | | |
|---|---|---|
| CN | 104238482 A | 12/2014 |
| KR | 10-2019-0032368 A | 3/2019 |
| WO | 2018/044471 A1 | 3/2018 |

OTHER PUBLICATIONS

Office Action issued in corresponding Chinese Patent Application No. 2019109725201 dated Oct. 17, 2022, with English translation.

*Primary Examiner* — San Htun
*Assistant Examiner* — Rui M Hu
(74) *Attorney, Agent, or Firm* — Morgan, Lewis & Bockius LLP (57) ABSTRACT

An acoustic communication system and a data transmission and reception method thereof are provided. The acoustic communication system may include a transmitter configured to generate data to be transmitted as an acoustic signal using a multi-tone encoding technique in a vehicle and output the generated acoustic signal and a receiver configured to receive the acoustic signal, decode the received acoustic signal using a multi-tone decoding technique, analyze the decoded acoustic signal, and output a warning signal.

11 Claims, 6 Drawing Sheets

(56) References Cited

U.S. PATENT DOCUMENTS

| | | | |
|---|---|---|---|
| 10,547,941 B1* | 1/2020 | Herman | B60Q 5/005 |
| 10,755,691 B1* | 8/2020 | Herman | G10K 11/17853 |
| 2004/0001553 A1* | 1/2004 | Steentra | H04L 27/2626 |
| | | | 375/260 |
| 2008/0239874 A1* | 10/2008 | Kemp | F42B 19/01 |
| | | | 367/131 |
| 2008/0304360 A1* | 12/2008 | Mozer | H04B 11/00 |
| | | | 367/117 |
| 2009/0067292 A1* | 3/2009 | Matsuoka | H04B 11/00 |
| | | | 367/137 |
| 2011/0150240 A1* | 6/2011 | Akiyama | H04B 1/7075 |
| | | | 375/150 |
| 2011/0196580 A1* | 8/2011 | Xu | B60K 35/00 |
| | | | 340/905 |
| 2013/0124061 A1* | 5/2013 | Khanafer | G01S 7/352 |
| | | | 701/1 |
| 2013/0141576 A1* | 6/2013 | Lord | G08G 1/096716 |
| | | | 348/148 |
| 2015/0012421 A1 | 1/2015 | Mexeev | |
| 2015/0123778 A1* | 5/2015 | Konet | G08G 1/166 |
| | | | 340/435 |
| 2015/0124950 A1* | 5/2015 | Koenig | H04M 3/002 |
| | | | 379/202.01 |
| 2015/0243291 A1* | 8/2015 | Shirahama | G10L 13/02 |
| | | | 704/500 |
| 2017/0132923 A1* | 5/2017 | Li | B60R 1/00 |
| 2017/0190331 A1* | 7/2017 | Gupta | B60Q 1/346 |
| 2018/0026728 A1* | 1/2018 | Feng | G10L 19/008 |
| | | | 704/500 |
| 2018/0053413 A1* | 2/2018 | Patil | G08G 1/0968 |
| 2018/0058203 A1* | 3/2018 | Clawson | E21B 47/14 |
| 2018/0115898 A1* | 4/2018 | Han | G05D 1/0055 |
| 2018/0137697 A1* | 5/2018 | Dudar | G07C 5/0808 |
| 2018/0252796 A1 | 9/2018 | Qu et al. | |
| 2018/0365908 A1* | 12/2018 | Liu | G05D 1/0061 |
| 2019/0248326 A1* | 8/2019 | McIntosh | B60R 25/2018 |
| 2019/0279508 A1* | 9/2019 | Wang | H04W 4/46 |
| 2019/0351918 A1* | 11/2019 | Maeng | B60W 30/18163 |
| 2020/0175959 A1* | 6/2020 | Cardinaux | G10K 15/02 |
| 2020/0213728 A1* | 7/2020 | Lopatka | G06N 3/08 |
| 2020/0223383 A1* | 7/2020 | Awad Alla | B60W 10/20 |
| 2020/0312152 A1* | 10/2020 | Lacaze | G05D 1/0255 |
| 2020/0396247 A1* | 12/2020 | Soryal | G08B 25/016 |
| 2021/0245735 A1* | 8/2021 | Wang | G08G 1/096816 |
| 2021/0344428 A1* | 11/2021 | Jones | H04B 11/00 |
| 2022/0055657 A1* | 2/2022 | McIntosh | B60W 60/001 |

* cited by examiner

ACOUSTIC COMMUNICATION SYSTEM AND DATA TRANSMISSION AND RECEPTION METHOD THEREFOR

CROSS-REFERENCE TO RELATED APPLICATION

The present application claims priority to and the benefit of Korean Patent Application No. 10-2019-0071698, filed on Jun. 17, 2019, which is incorporated herein by reference in its entirety.

TECHNICAL FIELD

The present disclosure relates to an acoustic communication system and a data transmission and reception method thereof.

BACKGROUND

The statements in this section merely provide background information related to the present disclosure and may not constitute prior art.

Because an electric vehicle does not have an internal combustion engine, noise does not almost occur when the electric vehicle drives its motor. Due to this, because pedestrians do not recognize an approaching vehicle, accidents frequently occur. Thus, several countries are forced to install an external speaker capable of artificially outputting an engine sound in an electric vehicle. For example, a method for increasing speaker volume when a pedestrian is detected using a front view camera and methods for receiving navigation map information and increasing volume near a street many people walk by or a school many children pass by are applied. Nevertheless, when a pedestrian uses his or her smartphone or puts on his or her earphone, it is difficult to still recognize an approaching vehicle. There is a limitation in drawing the attention of pedestrians in the manner which outputs a warning sound to pedestrians using such an external speaker.

Thus, in an existing technology, a method for directly transmitting vehicle access information to a user device (e.g., a smartphone, an earphone, a headphone, or the like) which is in use by a pedestrian using an information communication network such as vehicle to everything (V2X) is proposed. However, such an existing technology may share information between a vehicle and an information communication terminal of a pedestrian over the information communication network, but has the following problems. First, because there is a high probability that a time delay according to a communication network path will occur, the immediacy of the warning is degraded. Secondly, because the complexity of determining whether a certain vehicle should warn a certain pedestrian is very high in the downtown area where vehicles and pedestrians are concentrated, it is impossible to be implemented without a high degree of calculation processing system. Finally, it is still impossible to transmit information in an environment where a V2X infrastructure is not constructed.

Thus, a method for transmitting and receiving data through sound waves is proposed. When sound waves are used as media, it is able to perform transmission and reception within only a limited distance. Because it is able to receive signals through microphones of a pedestrian terminal and an earphone/headphone, it is unnecessary to construct a separate communication network infrastructure and it is able to transmit and receive signals immediately without a time delay between a vehicle and a terminal. However, such an existing technology has the following problems. First, when there is noise of the same frequency as a part of signal frequency arrangement, because a corresponding signal string is distorted or lost due to this noise, it is impossible to transmit information. Finally, because arrangement of a single frequency tone is coded and transmitted, it is possible to perform normal transmission/reception only when both of a transmitting end and a receiving end are not moved. When a relative speed is generated as one of the transmitting end and the receiving end is moved or as both the transmitting end and the receiving end are moved, because data is corrupt because a frequency of a signal sound is varied by the Doppler effect, it may be impossible to normally receive and recover signals.

SUMMARY

An aspect of the present disclosure provides an acoustic communication system for transmitting and receiving data using multi-tone (frequency) encoding and decoding and a data transmission and reception method thereof.

The technical problems to be solved by the present inventive concept are not limited to the aforementioned problems, and any other technical problems not mentioned herein will be clearly understood from the following description by those skilled in the art to which the present disclosure pertains.

In some forms of the present disclosure, an acoustic communication system may include: a transmitter that generates data to be transmitted as an acoustic signal using a multi-tone encoding technique in a vehicle and outputs the generated acoustic signal to the outside and a receiver that receives the acoustic signal, decodes the received acoustic signal using a multi-tone decoding technique, analyzes the decoded acoustic signal, and output a warning.

The transmitter may include a signal generator that generates a multi-tone acoustic signal using a predetermined multi-tone based code, a signal amplifier that amplifies the multi-tone acoustic signal, and an acoustic output device that converts the multi-tone acoustic signal amplified by the signal amplifier into a sound signal and outputs the converted sound signal to the outside of the vehicle.

The receiver may include a sound receiving device that receives an acoustic signal output from the transmitter, a processor that verifies contents of reception data by decoding the acoustic signal received by the sound receiving device, analyzes a Doppler distortion degree of the received acoustic signal and calculate a relative speed, and determines to output the warning based on the contents of the reception data and the relative speed, and an output device that outputs the warning depending on an instruction of the processor.

The acoustic communication system may further include a storage storing a predetermined multi-tone based code map. The processor may determine whether there is Doppler distortion or modification in the received acoustic signal by comparing the received acoustic signal with a reference signal in the predetermined multi-tone based code map.

The processor may recover an original signal using a relative distance between multi-tone acoustic signals, when it is determined that there is the Doppler distortion or the modification in the received acoustic signal.

The processor may output the warning via the output device, when it is determined that a current situation is a risky situation where the transmitter and the receiver are close to each other based on the relative speed.

The processor may perform ignore-processing without outputting the warning, when it is determined that a current situation is not a risky situation based on the relative speed.

In some forms of the present disclosure, a data transmission and reception method of an acoustic communication system may include: generating transmission data as an acoustic signal using a multi-tone encoding technique, amplifying the generated acoustic signal and outputting the amplified acoustic signal to the outside of a vehicle, receiving an acoustic signal from the outside of the vehicle, decoding and analyzing the acoustic signal using a multi-tone decoding technique, and outputting a warning based on the result of analyzing the acoustic signal.

The generating of the acoustic signal may include generating a multi-tone acoustic signal using a predetermined multi-tone based code.

The decoding and analyzing of the acoustic signal may include verifying Doppler distortion or modification of the acoustic signal by comparing the acoustic signal with a reference signal in a predetermined multi-tone based code map, recover the Doppler-distorted or modified signal using a signal recovery algorithm and converting the recovered signal into reception data, analyzing a Doppler distortion degree of the acoustic signal and calculating a relative speed, and determining a situation where it is necessary to output a warning, based on the reception data and the relative speed and outputting the warning.

The converting of the recovered signal into the reception data may include recovering a Doppler-distorted original signal using a relative distance between multi-tone acoustic signals.

The outputting of the warning may include outputting contents of the reception data together with the warning.

The method may further include performing ignore-processing, when it is determined that a current situation is a situation where it is unnecessary to output a warning based on the reception data and the relative speed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
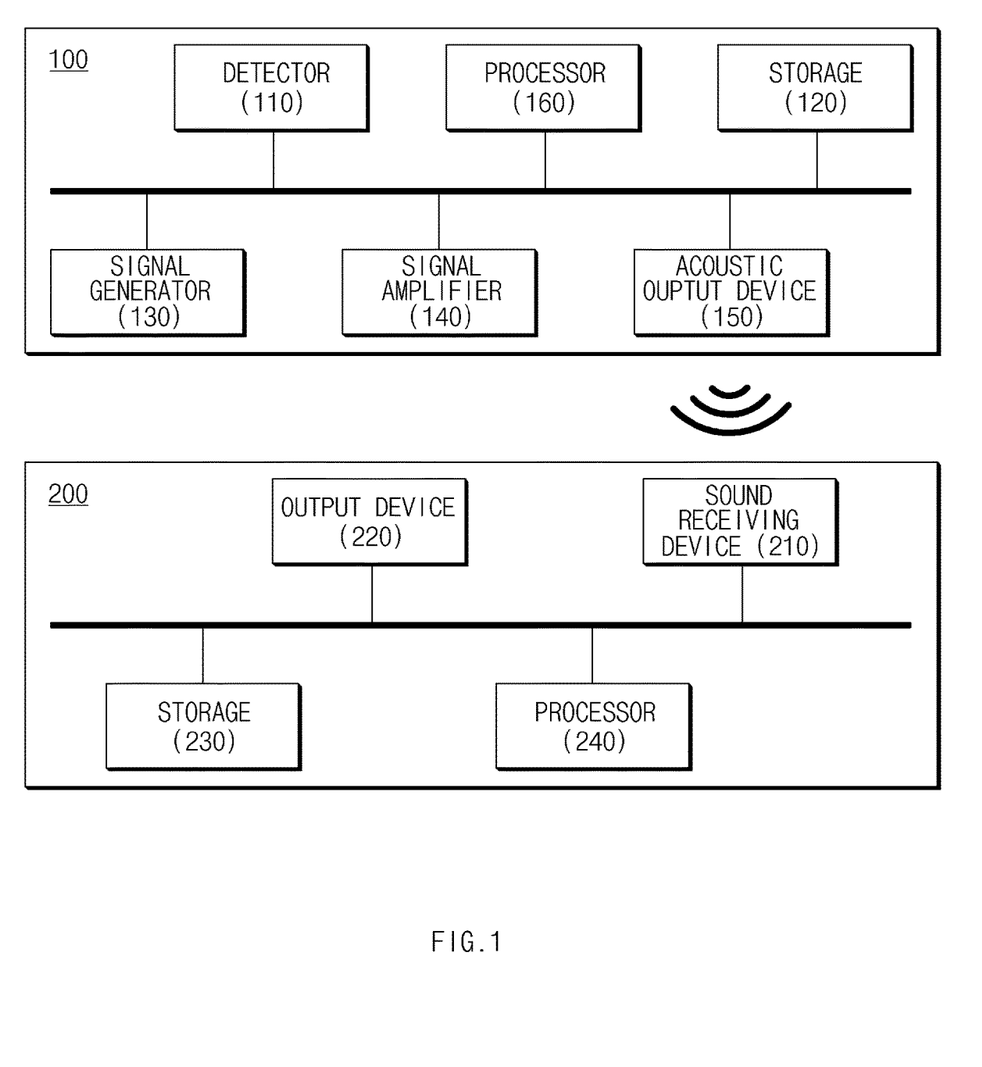
FIG. 1 is a block diagram illustrating a configuration of an acoustic communication system in one form of the present disclosure.
Figure 2:
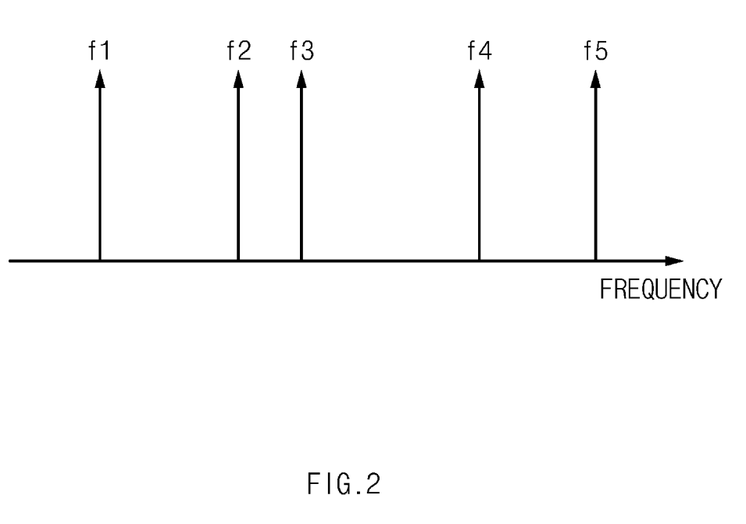
FIG. 2 is a drawing illustrating an example of generating a multi-tone code in one form of the present disclosure.

FIG. 1 is a block diagram illustrating a configuration of an acoustic communication system in some forms of the present disclosure. FIG. 2 is a drawing illustrating an example of generating a multi-tone code in some forms of the present disclosure.

Referring to FIG. 1, the acoustic communication system may include at least one or more of a transmitter 100 and a receiver 200. The acoustic communication system including the transmitter 100 or the transmitter 100 and the receiver 200 may be loaded into a vehicle. Furthermore, the acoustic communication system including the receiver 200 may be loaded into the vehicle or a user device. Herein, the user device may be implemented as a smartphone, an earphone, a headphone, and/or the like.

The transmitter 100 may convert information (data) to be transmitted into an acoustic signal using a multi-tone encoding technique. The transmitter 100 may output the converted acoustic signal to the outside of the vehicle. Such a transmitter 100 may include a detector 110, a storage 120, a signal generator 130, a signal amplifier 140, an acoustic output device 150, and a processor 160.

The detector 110 may detect information around the vehicle using various sensors mounted on the vehicle. The detector 110 may obtain information around the vehicle using an image sensor, a distance sensor, an advanced driver assistance system (ADAS) sensor, a radio detecting and ranging (radar), light detection and ranging (LiDAR), and/or the like.

The storage 120 may store a program for an operation of the processor 160. The storage 120 may store a lookup table defining an acoustic signal mapped for each information (data) to be transmitted, a predetermined multi-tone based code, and/or the like. The storage 120 may be implemented with at least one or more of storage media (recording media), for example, a flash memory, a hard disk, a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), a register, a removable disk, and a web storage.

The signal generator 130 may convert (generate) information (data) to be transmitted into (as) an electrical acoustic signal (an acoustic signal). The signal generator 130 may generate data to be transmitted as a multi-tone code, that is, a multi-tone acoustic signal using the multi-tone encoding technique. Because the multi-tone acoustic signal is robust to an external environment, such as Doppler distortion and an external noise influence due to a vehicle travel speed, reliability for data transmission may be enhanced.

The signal amplifier 140 may play a role in amplifying the multi-tone acoustic signal output from the signal generator 130. In other words, the signal amplifier 140 may amplify a level and/or intensity of the multi-tone acoustic signal depending on a predetermined logic.

The acoustic output device 150 may be an external speaker mounted on the vehicle. The acoustic output device 150 may output the multi-tone acoustic signal amplified by the signal amplifier 140 to the outside of the vehicle. In other words, the acoustic output device 150 may convert the amplified multi-tone acoustic signal into a sound signal and may output the converted sound signal to the outside of the vehicle.

The processor 160 may obtain information around the vehicle by means of the detector 110 and may analyze the obtained information, thus determining information to be transmitted (hereinafter referred to as "transmission data"). The processor 160 may transmit the determined transmission data to the signal generator 130.

The processor 160 may control an overall operation of the components constituting the transmitter 100. The processor 160 may be implemented with at least one or more of an application specific integrated circuit (ASIC), a digital signal processor (DSP), programmable logic devices (PLD), field programmable gate arrays (FPGAs), a central processing unit (CPU), microcontrollers, and microprocessors.

The receiver 200 may receive an acoustic signal from the outside and may decode the received multi-tone acoustic signal using a multi-tone decoding technique, thus verifying contents of reception data. Furthermore, the receiver 200 may analyze a Doppler distortion rate of the received acoustic signal and may calculate a relative speed. The receiver 200 may determine a situation where it is necessary to output a warning based on the contents of the reception data and the relative speed and may output the warning. Such a receiver 200 may include a sound receiving device 210, an output device 220, a storage 230, and a processing unit 240.

The sound receiving device 210 may include a microphone (not shown) which is mounted on the vehicle or the user device to receive a sound signal from the outside. The sound receiving device 210 may convert a sound signal received via the microphone into an acoustic signal (electrical signal). In other words, an acoustic signal transmitted from the transmitter 100 may be received via the sound receiving device 210.

The output device 220 may be to output a variety of information and may include a display, an acoustic output module, a haptic module, and the like. The output device 220 may output a warning depending to an instruction of the processing unit 240. For example, the output device 220 may output a warning message (e.g., including a warning reason) and/or a warning sound.

The display may be a device which displays visual information and may include one or more of a liquid crystal display (LCD), a thin film transistor-LCD (TFT LCD), an organic light-emitting diode (OLED) display, a flexible display, a three-dimensional (3D) display, a transparent display, a head-up display (HUD), a touch screen, and a cluster. The acoustic output module may output audio data stored in the storage 230. The acoustic output module may include a receiver, a speaker, a buzzer, and/or the like. The haptic module may output a signal in a form a user may recognize with his or her tactile sense. For example, the haptic module may be implemented as a vibrator to control vibration intensity, a vibration pattern, and the like.

The storage 230 may store a program for an operation of the processor 240. Furthermore, the storage 230 may store a predetermined multi-tone based code map, a signal recovery algorithm, and the like. Herein, the predetermined multi-tone based code map may be used as a reference signal when a received acoustic signal is analyzed.

The storage 230 may be implemented with at least one or more of storage media (recording media), for example, a flash memory, a hard disk, an SD card, a RAM, an SRAM, a ROM, a PROM, an EEPROM, an EPROM, a register, and a removable disk.

The processor 240 may be implemented with at least one or more of an ASIC, a DSP, PLD, FPGAs, a CPU, microcontrollers, and microprocessors.

The processor 240 may receive an acoustic signal from the outside via the sound receiving device 210. The processor 240 may decode the received acoustic signal (the analog signal) using the multi-tone decoding technique and may convert the decoded signal into reception data (a digital signal). In this case, the processor 240 may compare and analyze the received acoustic signal with a reference signal to determine (check) whether Doppler distortion occurs in the acoustic signal and/or whether signal modification occurs as a specific frequency signal tone is lost or introduced due to external noise or the like. In other words, the processor 240 may compare each code of the received acoustic signal with a reference code in a predetermined multi-tone based code map to determine whether There is Doppler distortion and/or modification in the acoustic signal.

The processor 240 may recover the Doppler-distorted or modified signal using a signal recovery algorithm and may convert the recovered signal into reception data. In this case, the processor 240 may recover a Doppler-distorted original signal using a relative distance between multi-tone acoustic signals. The processor 240 may recover the Doppler-distorted original signal using a relative distance between frequency tones of the multi-tone acoustic signal.

The processor 240 may analyze Doppler distortion information of the received acoustic signal and may calculate a relative speed. The processor 240 may calculate a Doppler distortion rate of the received acoustic signal and may calculate a relative speed from the calculated Doppler distortion rate.

The processor 240 may determine a risk level based on contents of the reception data and the relative speed. The processor 240 may determine a current situation as a situation whether it is necessary to output a warning or whether it is unnecessary to output a warning, depending on the risk level.

When it is determined that the current situation is a risky situation, the processor 240 may output a warning to the output device 220. The processor 240 may output the contents of the reception data on a display screen in the form of visual information such as an image or text. The processor 240 may output the warning to the output device 220, for example, a speaker, an earphone, a headphone, and/or the like, in the form of audible information such as a warning sound.

Meanwhile, when it is determined that the current situation is not the risky situation based on the contents of the reception data and the relative speed, the processor 240 may perform ignore-processing. In other words, when it is determined that the current situation is the situation where it is unnecessary to output the warning as a result of determining the risk level based on the contents of the reception data and the relative speed, the processor 240 may perform ignore-processing without outputting the warning. For example, when the transmitter 100 and the receiver 200 become distant from each other, the processor 240 may determine the current situation as a situation where it is unnecessary to output a warning and may fail to output the warning.

Hereinafter, a description will be given of the principle of generating and recovering a multi-tone code used in some forms of the present disclosure.

A code of a binary or 16-ary signal or the like may be assigned according to arrangement of a plurality of frequency tones f1 to f5 shown in FIG. 2, and a code may be generated using the assigned code. In this case, coding may be performed to have different relative distance combinations between frequencies arranged in Table 1 below.

TABLE 1

| Code | f1 | f2 | f3 | f4 | f5 |
|------|------|--------|------|------|------|
| 00 | 1 kHz | 2*f1 | 3*f1 | 5*f1 | 7*f1 |
| 01 | 1 kHz | 2.5*f1 | 4*f1 | 8*f1 | 9*f1 |

Because all frequency tones in a multi-tone code are changed at the same rate depending on a relative speed in Doppler distortion, an original code may be estimated from a relative rate of respective received tone components. A relative speed may be calculated from a frequency change rate using Equation 1 below.

$$f' = \left(\frac{v + v_0}{v - v_s}\right)f \quad \text{[Equation 1]}$$

Herein, f denotes the real frequency of the wave, f' denotes the frequency observed by the observer, v denotes the velocity in the medium of the wave, $v_s$ denotes the velocity of the wave source for the medium and is positive when the wave source moves in the direction of the observer, $v_0$ denotes the velocity of the observer for the medium and is positive when the observer moves in the direction of the wave source. The observed frequency in the two velocities $v_s$ and $v_0$ increases when the wave source approaches the observer or when the observer moves to the wave source. Frequencies decreases when they are distant from each other.

Furthermore, when encoded into multiple tones, although some of the multiple tones are lost due to external noise or the like, an original signal may be recovered by a relative rate between remaining frequency components. Depending on such a principle, acoustic-based data transmission and reception robust to an external environment is possible.

Figure 3:
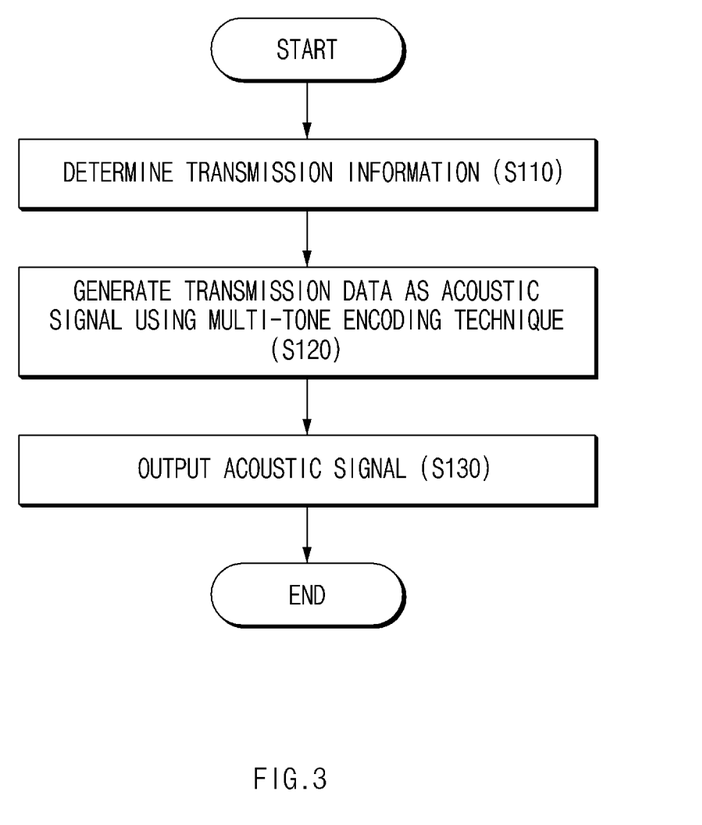
FIG. 3 is a flowchart illustrating a data transmission method of an acoustic communication system in one form of the present disclosure.

FIG. 3 is a flowchart illustrating a data transmission method of an acoustic communication system in some forms of the present disclosure.

In S110, a processor 160 of FIG. 1 may determine data to be transmitted, that is, transmission data. The processor 160 may transmit the transmission data to a signal generator 130 of FIG. 1. The processor 160 may obtain information around a vehicle by means of a detector 110 of FIG. 1 and may determine transmission data (e.g., a pedestrian protection sound) based on the obtained information.

In S120, a signal generator 130 of FIG. 1 may generate the transmission data as an acoustic signal using a multi-tone encoding technique. In other words, the signal generator 130 may convert the transmission data into a multi-tone acoustic signal.

In S130, the signal generator 130 may output the generated multi-tone acoustic signal to the outside of the vehicle. The signal generator 130 may output the generated multi-tone acoustic signal to a signal amplifier 140 of FIG. 1. The signal amplifier 140 may amplify the multi-tone acoustic signal and may deliver the amplified multi-tone acoustic signal to an acoustic output device 150 of FIG. 1. The acoustic output device 150 may convert the multi-tone acoustic signal into a sound signal and may output the converted sound signal to the outside of the vehicle.

For example, when a pedestrian walks in a narrow alley or crosses the street in a state where he or she focuses on only a screen of his or her smartphone or when a user moves in a state where he or she puts on his or her earphone (or headphone), a transmitter 100 of FIG. 1 may convert a pedestrian protection sound into a multi-tone acoustic signal and may output the converted multi-tone acoustic signal to the outside of the vehicle.

Figure 4:
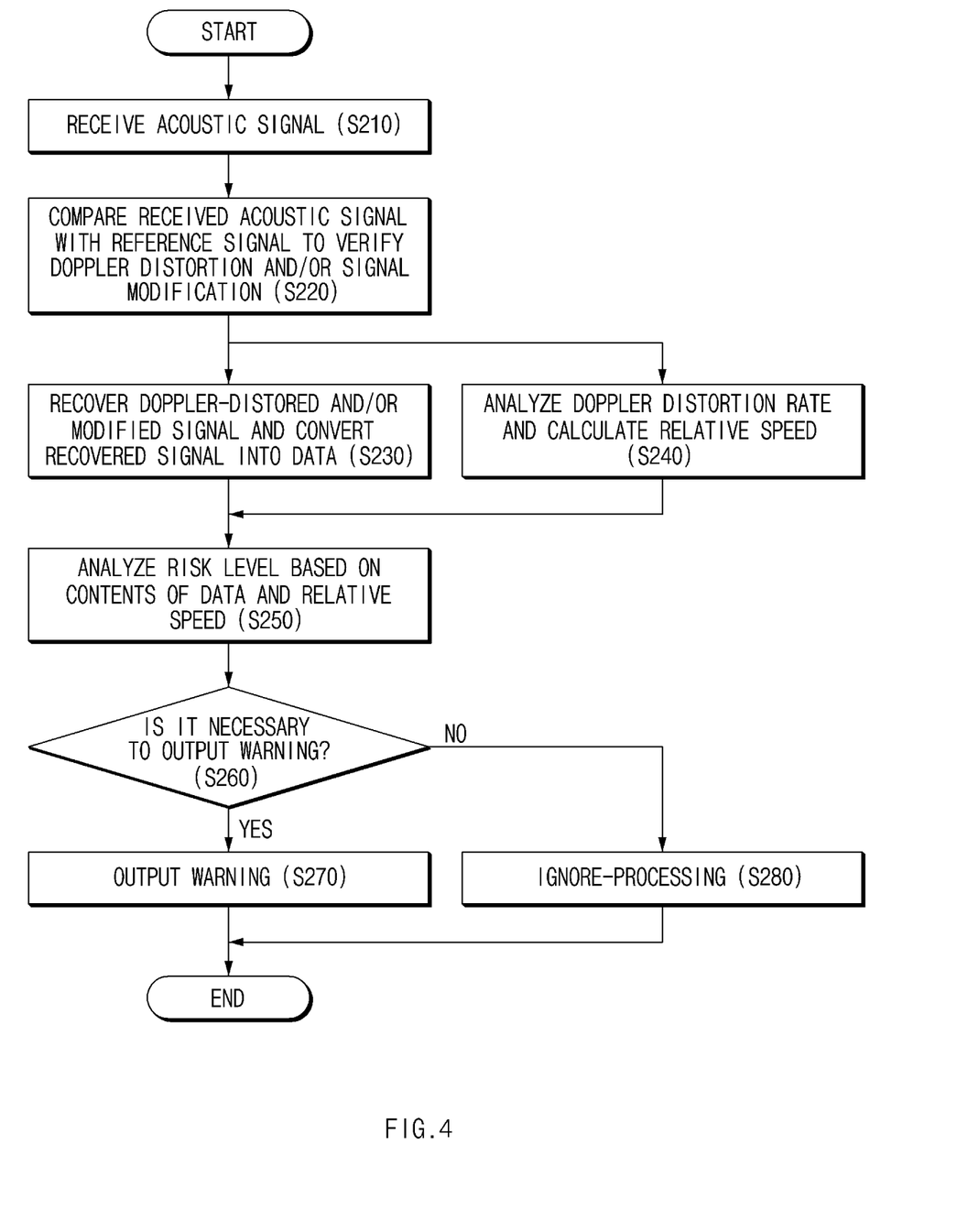
FIG. 4 is a flowchart illustrating a data reception method of an acoustic communication system in one form of the present disclosure.

FIG. 4 is a flowchart illustrating a data reception method of an acoustic communication system in some forms of the present disclosure.

Referring to FIG. 4, in S210, a receiver 200 of FIG. 1 may receive an acoustic signal from the outside via a sound receiving device 210 of FIG. 1. The sound receiving device 210 may receive a sound signal received from the outside and may convert the received sound signal into an acoustic signal.

In S220, a processor 240 of the receiver 200 may compare the received acoustic signal with a reference signal to verify Doppler distortion and signal modification. The processor 240 may determine whether Doppler distortion occurs in the received acoustic signal and/or whether modification (corruption) such as signal loss or signal introduction occurs in the received acoustic signal.

When it is determined that the Doppler distortion or the signal modification occur in the received acoustic signal, in S230, the processor 240 may recover the Doppler-distorted and/or modified signal using a signal recovery algorithm and may convert the recovered signal into reception data (digital data). The processor 240 may recover a Doppler-distorted original signal using a relative distance between multi-tone acoustic signals.

In S240, the processor 240 may analyze a Doppler distortion degree of the received acoustic signal and may calculate a relative speed. The processor 240 may calculate a Doppler distortion rate of the received acoustic signal and may calculate a relative speed from the Doppler distortion rate.

In S250, the processor 240 may analyze a risk level based on contents of the reception data and the relative speed. The processor 240 may determine a current situation as a situation where it is necessary to output a warning or a situation where it is unnecessary to output a warning, based on the contents of the reception data and the relative speed.

In S260, the processor 240 may determine whether the current situation is the situation where it is necessary to output the warning, based on the result of analyzing the risk level.

When it is determined that the current situation is the situation where it is necessary to output the warning, in S270, the processor 240 may output the warning. In this case, the processor 240 may output the contents of the reception data, a warning sound, and/or the like.

When it is determined that the current situation is the situation where it is unnecessary to output the warning, in S280, the processor 240 may perform ignore-processing. In other words, when the current situation is not the situation where it is necessary to output the warning, the processor 240 may fail to output the warning.

For example, the receiver 200 in a smartphone may receive a multi-tone acoustic signal via a microphone of the smartphone, may decode the received multi-tone acoustic signal to be recovered as a pedestrian protection sound, and may analyze the recovered pedestrian protection sound. When it is determined that a vehicle approaches a pedestrian, the receiver 200 may output a warning sentence on a screen of the smartphone.

Alternatively, the receiver 200 in an earphone (a headphone) on which a user puts may receive an acoustic signal output from a vehicle via a microphone mounted on the earphone or a microphone in a smartphone, may decode the acoustic signal to be recovered as a pedestrian protection sound, and may analyze the recovered pedestrian protection sound. When it is determined that the vehicle approaches a pedestrian, the receiver 200 may immediately output a warning sound or a guidance voice to the earphone.

Figure 5:
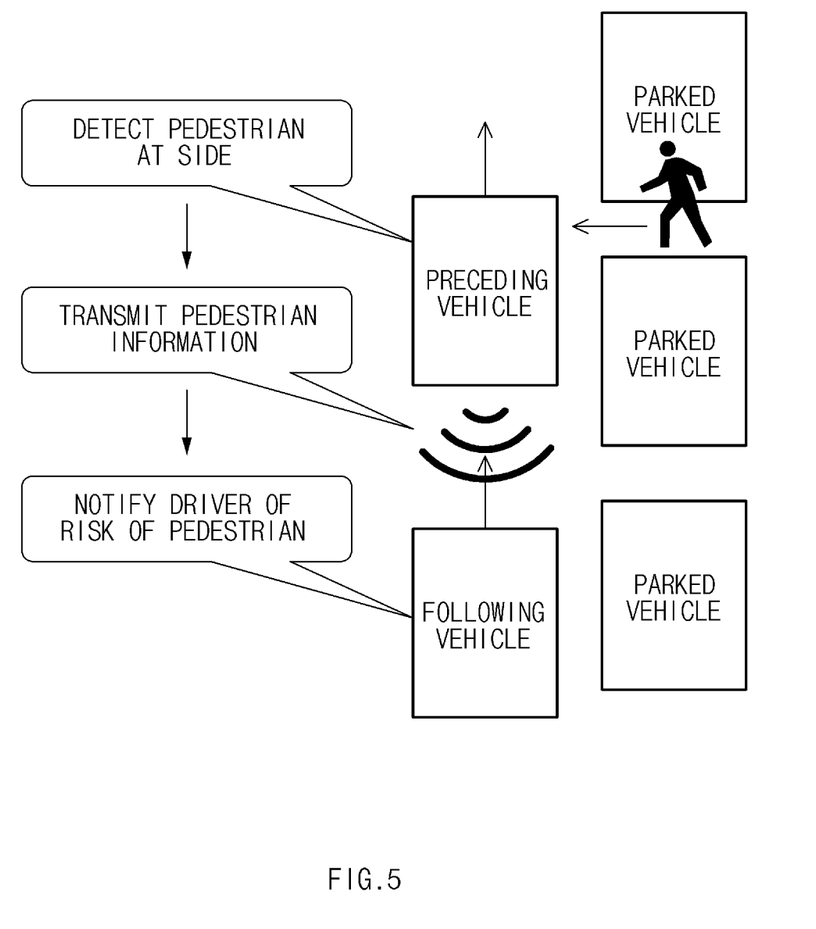
FIG. 5 is a drawing illustrating an example of transmitting and receiving data in one form of the present disclosure.

FIG. 5 is a drawing illustrating an example of transmitting and receiving data in some forms of the present disclosure.

When a pedestrian attempts to cross a lane between vehicles parked on the side of the road in an environment where a vehicle-to-everything (V2X) infrastructure is not constructed, for example, a residential area and/or an alley, a transmitter 100 of a preceding vehicle may detect the pedestrian using a surround view or the like and may generate transmission data matched to the pedestrian as a multi-tone acoustic signal to output the generated multi-tone acoustic signal.

A receiver 200 of a following vehicle may receive and analyze the multi-tone acoustic signal and may output a forward situation where the pedestrian is not seen in the form of visual information such as an image or in the form of audible information such as a warning sound, a guidance sound, and/or the like to warn a driver. Simultaneously, a transmitter 100 of the following vehicle may increase an output level of a pedestrian protection sound output via an external speaker to warn the pedestrian, thus preventing an additional accident.

Figure 6:
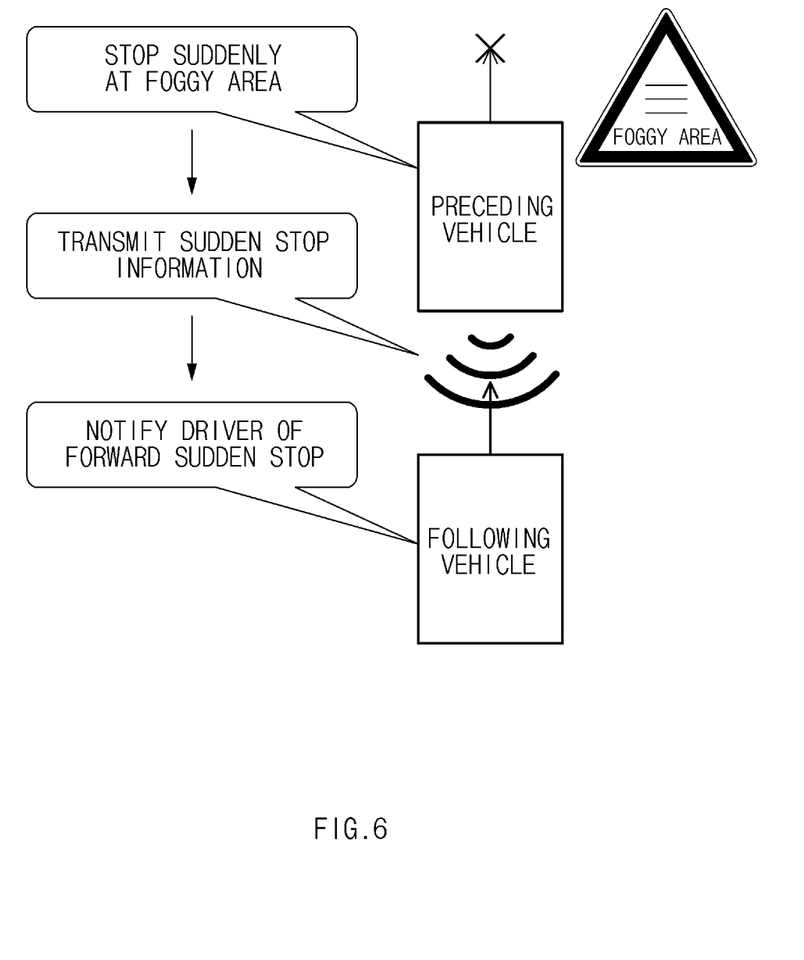
FIG. 6 is a drawing illustrating another example of transmitting and receiving data in one form of the present disclosure.

FIG. 6 is a drawing illustrating another example of transmitting and receiving data in some forms of the present disclosure.

As shown in FIG. 6, when a forward view is not good due to fog or the like in an environment where a V2X infrastructure is not constructed, for example, a national highway, a preceding vehicle may travels while transmitting an acoustic signal associated with driving of a foggy area via a transmitter 100, when recognizing the driving of the foggy area through navigation information or by interacting with a fog light switch or the like. When a sudden stop occurs while driving, the preceding vehicle may additionally output an acoustic signal for providing a notification of the sudden stop.

A receiver 200 of a following vehicle may receive and analyze the acoustic signal associated with the driving of the foggy area and the acoustic signal for providing a notification of the sudden stop. When receiving the acoustic signal for providing the notification of the sudden stop as a result of the analysis, the receiver 200 may output a warning message and/or a warning sound or a guidance sound to warn a driver. At the same time, the following vehicle may interact with an advanced driver assistance system (ADAS) to prevent an accident.

In some forms of the present disclosure, the acoustic communication system may perform data transmission and reception using multi-tone encoding and decoding, thus performing reliable data transmission robust to an external environment and contributing to ensuring pedestrian safety.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An acoustic communication system, comprising:
   a transmitter configured to: generate data to be transmitted as a multi-tone acoustic signal using a multi-tone encoding technique in a vehicle; and output the generated multi-tone acoustic signal to an outside of the vehicle; and
   a receiver configured to: receive the multi-tone acoustic signal; decode the received multi-tone acoustic signal using a multi-tone decoding technique; analyze the decoded multi-tone acoustic signal; and output a warning signal,
   wherein the receiver comprises a processor configured to:
   verify contents of reception data by decoding the multi-tone acoustic signal received from the outside of the vehicle; analyze a Doppler distortion degree of the received multi-tone acoustic signal and calculate a relative speed; and
   determine to output the warning signal based on the contents of the reception data and the relative speed,
   wherein the processor is further configured to determine whether a Doppler distortion or modification in the received multi-tone acoustic signal is present by comparing the received multi-tone acoustic signal with a reference signal in a predetermined multi-tone based code map stored in a storage, and
   wherein the processor is further configured to recover the multi-tone acoustic signal affected by the Doppler distortion or modification using a signal recovery algorithm and to convert the recovered signal into the reception data.

2. The acoustic communication system of claim 1, wherein the transmitter comprises:
   a signal generator configured to generate the multi-tone acoustic signal using a predetermined multi-tone based code;
   a signal amplifier configured to amplify the multi-tone acoustic signal; and
   an acoustic output device configured to:
   convert the amplified multi-tone acoustic signal into a sound signal; and output the converted multi-tone acoustic signal to the outside of the vehicle.

3. The acoustic communication system of claim 1, wherein the receiver further comprises:
a sound receiving device configured to receive the outputted multi-tone acoustic signal; and
an output device configured to output the warning signal depending on an instruction of the processor.

4. The acoustic communication system of claim 1, wherein the processor is further configured to recover an original signal using a relative distance from among a plurality of multi-tone acoustic signals, when the Doppler distortion or the modification in the received multi-tone acoustic signal is determined to be present.

5. The acoustic communication system of claim 4, wherein the processor is further configured to output the warning signal via an output device when a current situation is a risky situation where the transmitter and the receiver are close to each other based on the relative speed.

6. The acoustic communication system of claim 4, wherein the processor is further configured to perform an ignore-processing without outputting the warning signal when a current situation is not a risky situation based on the relative speed.

7. A data transmission and reception method for an acoustic communication system, the method comprising:
generating transmission data as a multi-tone acoustic signal using a multi-tone encoding technique;
amplifying the generated multi-tone acoustic signal and outputting the amplified multi-tone acoustic signal to an outside of a vehicle;
receiving the multi-tone acoustic signal from the outside of the vehicle;
decoding and analyzing the multi-tone acoustic signal using a multi-tone decoding technique; and
outputting a warning signal based on an analyzation of the multi-tone acoustic signal,
wherein the decoding and analyzing the multi-tone acoustic signal comprises:
verifying contents of reception data by decoding the multi-tone acoustic signal received from the outside of the vehicle;
analyzing a Doppler distortion degree of the received multi-tone acoustic signal and calculating a relative speed; and
determining to output the warning signal based on the contents of the reception data and the relative speed, and
wherein the verifying contents of reception data comprises:
verifying whether the multi-tone acoustic signal is affected by the Doppler distortion or modification by comparing the multi-tone acoustic signal with a reference signal in a predetermined multi-tone based code map, and recovering the multi-tone acoustic signal affected by the Doppler distortion or modification using a signal recovery algorithm and converting the recovered signal into the reception data.

8. The method of claim 7, wherein the generating transmission data as a multi-tone acoustic signal comprises
generating the multi-tone acoustic signal using a predetermined multi-tone based code.

9. The method of claim 7, wherein the converting the recovered signal into the reception data comprises recovering an original signal using a relative distance from among a plurality of multi-tone acoustic signals.

10. The method of claim 7, wherein the outputting a warning signal comprises outputting the contents of the reception data with the warning signal.

11. The method of claim 7, further comprising performing an ignore-processing when it is determined that a current situation is the situation that requires to output the warning signal based on the reception data and the relative speed.

* * * * *